(12) United States Patent
Schwartz et al.

(10) Patent No.: US 8,527,675 B2
(45) Date of Patent: Sep. 3, 2013

(54) SYSTEM AND METHOD FOR IMPLEMENTING A SECURE PROCESSOR DATA BUS

(75) Inventors: Allen M. Schwartz, Fort Wayne, IN (US); Andrew L. Martin, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 161 days.

(21) Appl. No.: 13/191,845

(22) Filed: Jul. 27, 2011

(65) Prior Publication Data

US 2013/0031290 A1    Jan. 31, 2013

(51) Int. Cl.
*G06F 3/00* (2006.01)
*G06F 21/00* (2013.01)

(52) U.S. Cl.
USPC .................. 710/38; 710/8; 710/107; 713/189

(58) Field of Classification Search
USPC .................. 710/8, 36, 38, 107, 306; 713/189
See application file for complete search history.

(56) References Cited

U.S. PATENT DOCUMENTS

| | | | |
|---|---|---|---|
| 8,321,926 B1 * | 11/2012 | Sutterfield et al. | 726/11 |
| 8,356,358 B2 * | 1/2013 | Goldman et al. | 726/26 |
| 2007/0255966 A1 * | 11/2007 | Condorelli et al. | 713/194 |

OTHER PUBLICATIONS

"FPGA-Based Single Chip Cryptographic Solution"; McLean, Mark and Moore, Jason; Military Embedded Systems; OpenSystems Publishing; 2007.*
"Crypto-processor With Secured Key Management"; Laboratoire Hubert Curien; 8th CryptArchi Workshop; Gif-sur-Yvette, Paris, France; Jul. 27, 2010.*

* cited by examiner

*Primary Examiner* — Glenn A Auve
(74) *Attorney, Agent, or Firm* — Daly, Crowley, Mofford & Durkee, LLP

(57) ABSTRACT

System and method for implementing a secure processor data bus are described. One embodiment is a circuit comprising a processor disposed in a processor partition, the circuit further comprising a first set of peripherals disposed in a first peripheral partition; a second set of peripherals disposed in a second peripheral partition physically isolated from the first peripheral partition; a first state control register for controlling access to the first set of peripherals by the processor; and a second state control register for controlling access to the second set of peripherals by the processor. When the first and second state control registers are in a first mode of operation, the processor has read and write access to the first set of peripherals and write only access to the second set of peripherals. When the first and second state control registers are in a second mode of operation, the processor has read and write access to the second set of peripherals and read only access to the first set of peripherals.

20 Claims, 4 Drawing Sheets

SYSTEM AND METHOD FOR IMPLEMENTING A SECURE PROCESSOR DATA BUS

STATEMENT REGARDING FEDERALLY SPONSORED RESEARCH

This invention was made with Government support under Contract No. F33657-02-D-0009 awarded by the U.S. Air Force. The Government has certain rights in this invention.

BACKGROUND

Single Chip Cryptographic ("SCC") technology enables FPGA designs to process both unencrypted ("red") and encrypted ("black") data on a single field-programmable gate array ("FPGA") by enabling fail-secure data separation via physical separation between two or more regions, or "partitions" within the FPGA. A design can be created that isolates red data in one or more SCC partitions from black data in one or more other SCC partitions. As long as no communication paths exist between the physically separate partitions, the SCC technology alone ensures that the red and black data remain separate.

Issues arise in situations in which a design requires communication between the physically separate SCC partitions used to provide the fail-secure data separation. While SCC technology can ensure fail-secure data communications between the SCC partitions, it cannot ensure what information is placed on those data connections. If within a particular design, a red data SCC partition sends red data to a black SCC partition, the red/black data separation has been violated in a manner that does not constitute an SCC technology failure. To allow communication between the physically separate SCC partitions, the design within both partitions must provide fail-secure data separation on what data is sent over the data connections. Note that the fail-secure design solution that controls what data is sent over the data connections must operate within the SCC partitions to ensure red and black data separation. Together, this provides separation between the partitions, the connections, and the data over the connections.

The most common type of communications within FPGA-based information system is processor data buses communicating to peripherals or interfaces. The difficulty occurs when the FPGA's processor data bus is required to communicate with peripherals in more than one SCC partition. Data buses on the peripherals in black data SCC partitions must not be exposed to red data contained within red data SCC partitions with a high level of assurance. Since FPGA processor systems typically use a common data bus, communication with a red peripheral would expose that data to the input ports of the black peripheral interfaces. A failure within the FPGA could expose red data on the data bus connected to the black data SCC partition. This situation would be a violation of the red/black separation.

One solution to the above-noted issues is to use multiple processors (in separate FPGAs or separate SCC partitions). One processor will process the red data and the other the black data. A communication method is established that does not use the common data bus. An obvious problem with this solution is the additional resource utilization it requires. Having a second processor costs FPGA resources as well as additional software resources to support it.

Another common solution is to use different data buses. A problem with this solution is that processors have a limited number of data buses. Many use one for software instructions and another for software, as well as peripheral, data. If instructions and data are stored on external memory, a single data bus must be used for both instructions and data, which eliminates the possibility of using two separate buses. In this case, if the external memory is black, the entire bus must be black.

BRIEF DESCRIPTION OF THE DRAWINGS

A better understanding of the present invention will be realized from the detailed description that follows, taken in conjunction with the accompanying drawings, in which.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting.

Figure 1:
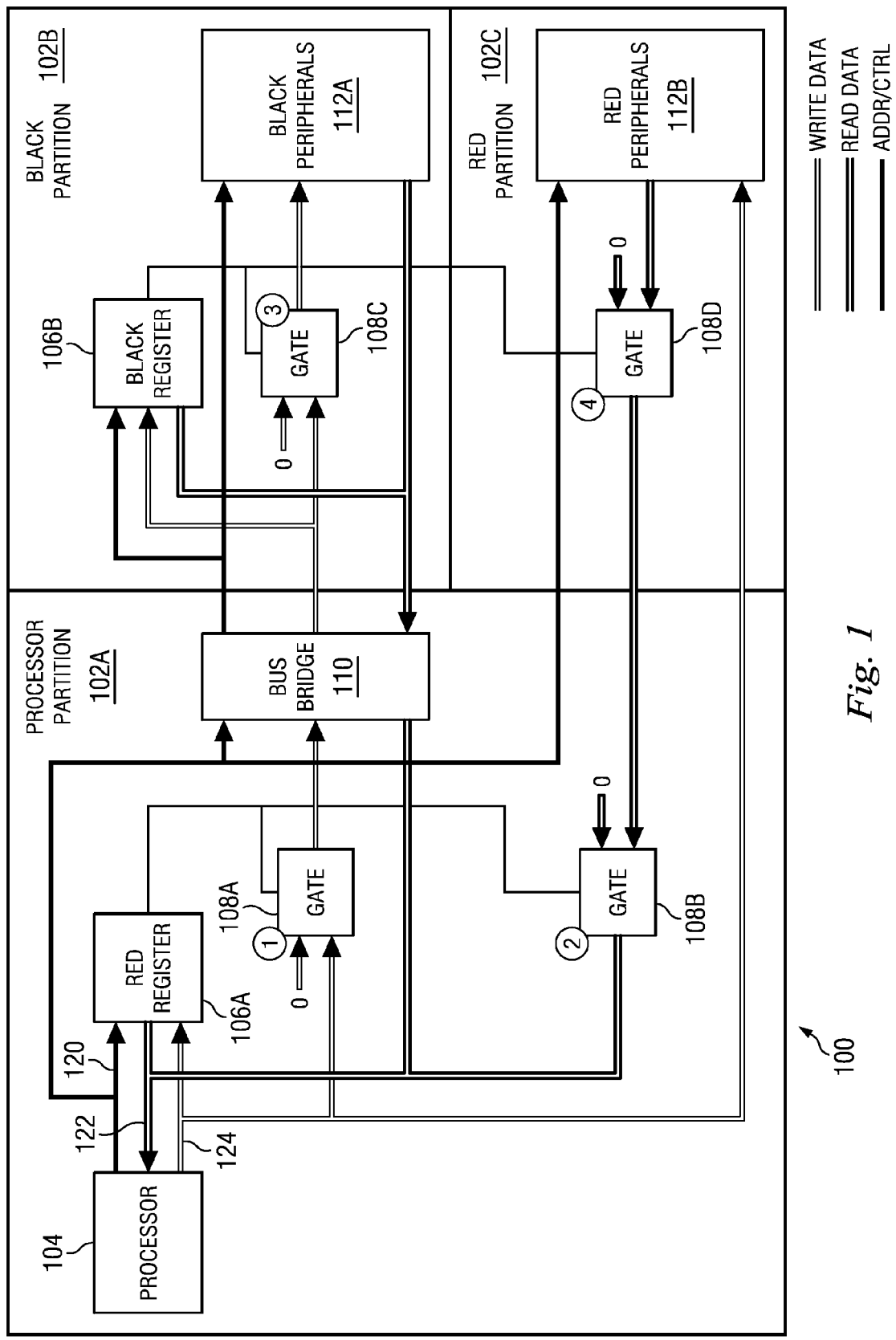
FIG. 1 is a block diagram of a circuit 100 for implementing separation of red and black data on an FPGA internal data bus in accordance with one embodiment.

FIG. 1 is a block diagram of a circuit 100 for implementing separation of red and black data on an FPGA internal data bus in accordance with one embodiment. As shown in FIG. 1, the circuit 100 is divided into three partitions, including a processor partition 102A, a black partition 102B, and a red partition 102C. The red and black partitions 102B, 102C, are physically separate, in accordance with SCC specifications. The circuit 100 further includes a processor 104, which is located in the processor partition 102A, and two state control registers, including a red state control register 106A located in the processor partition 102A and a black state control register 106B located in the black partition 102B. The circuit 100 further includes four data gates 108A-108D. As shown in FIG. 1, the gates 108A and 108B are located in the processor partition 102A, while the gate 108C is located in the black partition 102B and the gate 108D is located in the partition 102C. The gate 108A may be alternately referred to as herein the "processor partition black gate," the gate 108B may be alternately referred to herein as the "processor partition red gate," the gate 108C may be alternately referred to herein as the "black partition gate" and the gate 108D may be alternately referred to herein as the "red partition gate." A bus bridge 110 located in the processor partition 102A provides communication access between the processor 104 and the black partition 102B, comprising black peripherals 112A, as will be described.

In one embodiment, the gates 108A-108D are implemented using two-input multiplexers ("MUXes") each having one input tied to logic 0 and the other connected to receive data to be written to or read from corresponding peripherals. The registers 106A, 106B, provide select signals to their respective gates. When MUXes are used to implement the gates 108A-108D, the gate is "closed" by selecting the input tied to logic 0. The state of each of the gates 108A and 108B is controlled by the red register 106A, while the state of each of the gates 108C and 108D is controlled by the black register 106B. Control and address signals output from the processor 104 on a line 120 are provided directly to the red register 106A and red peripherals 112B. Control and address signals output on the line 120 are provided to the black register 106B and black peripherals 112A via the bus bridge 110.

Figure 2:
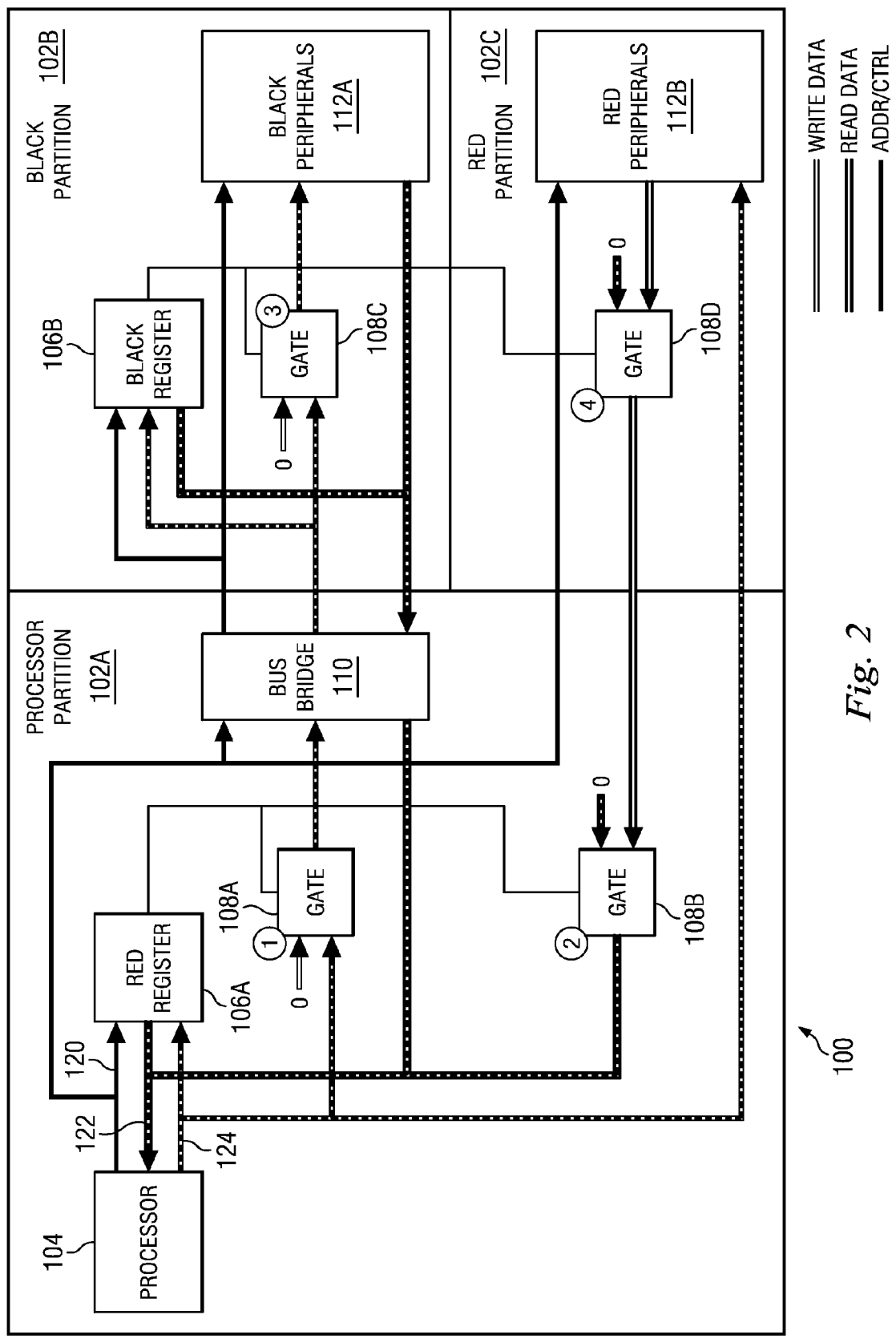
FIG. 2 illustrates the circuit of FIG. 1 in Black Mode operation.

As will be described in greater detail below, in accordance with embodiments described herein, the circuit 100 has two operational modes: Black Mode and Red Mode. Black Mode operation is illustrated in FIG. 2. In Black Mode, the processor 104 is prevented from reading red data from the red peripherals 112B by gates 108B and 108D, both of which are closed. As noted above, the state of the gate 108B is controlled by the red register 106A and the state of the gate 108D is controlled by the black register 106B. In Black Mode, the processor 104 has full access to the black peripherals 112A and write only access to the red peripherals 112B. Any read attempts from the red peripherals 112B by the processor 104 return only zeros (produced by the gate 108B or by gate 108D if gate 108B fails). As shown in FIG. 2, black data is read from the black partition 102B (i.e., the black peripherals 112A and the black register 106B) via the bus bridge 110 and provided to the processor 104 via a read line 122. Black data output from the processor 104 on a write line 124 is written to the black peripherals 112A via the gate 108A, which is open in Black Mode, the bus bridge 110, and the gate 108C, which is also open in Black Mode. Black data is written to the black register 106B via the gate 108A and the bus bridge 110. Red data is blocked from being read from the red peripherals 112B via gates 108B and 108D, both of which are closed, but can be written to the red register 106A and the red peripherals 112B directly.

Figure 3:
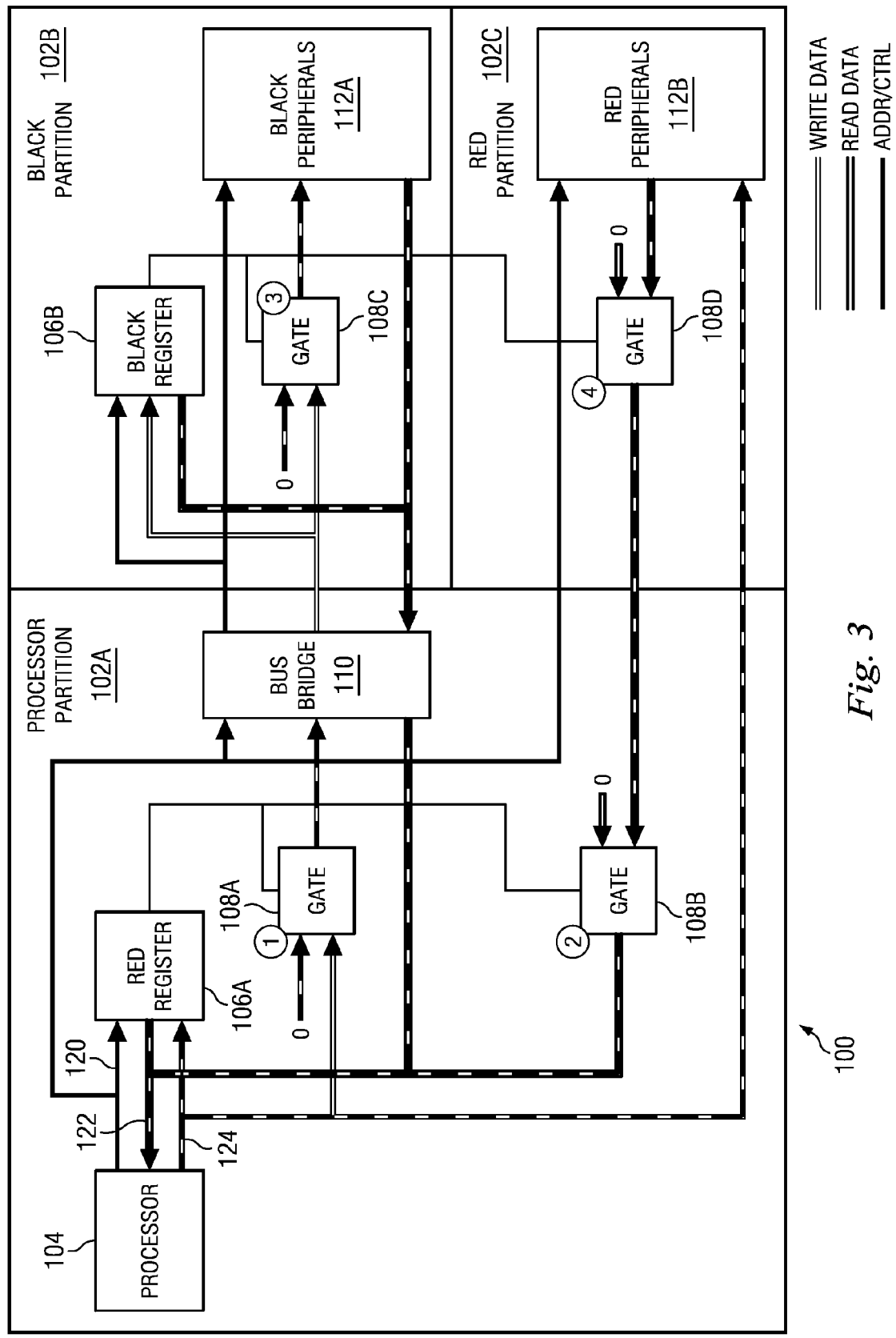
FIG. 3 illustrates the circuit of FIG. 1 in Red Mode operation.

FIG. 3 illustrates Red Mode operation of the circuit 100. In Red Mode, red data is prevented from being written to the black peripherals 112A by the gate 108A and the gate 108C, both of which are closed. As noted above, the state of the gate 108A is controlled by the red register 106A and the state of the gate 108C is controlled by the black register 106B. In Red Mode, the processor 104 has full access to the red peripherals 112B and read-only access to the black peripherals 112A. Any attempts to write to the black peripherals 112A will write only zeros (produced by the gate 108C or by gate 108A if gate 108C fails). As shown in FIG. 3, red data is written to the red register 106A and red peripherals 112B directly from the processor 104 via the write line 124. Red data is read from the red peripherals via the gates 108D and 108B, both of which are open, via the read line 122. Red data is read directly from the red register 106A via the read line 122. Black data can be read from the red peripherals 106A and red register 106B via the bus bridge 110.

Figure 4A:
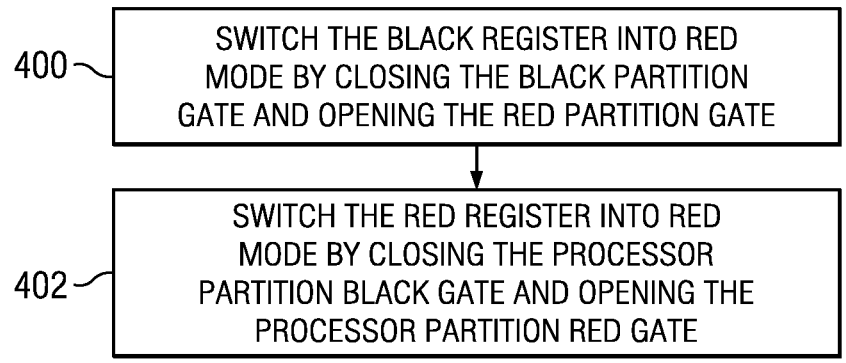
FIGS. 4A and 4B are flowcharts illustrating steps implemented in switching the circuit of FIG. 1 in from Black Mode to Red Mode operation and from Red Mode to Black Mode operation, respectively.

As previously noted, the bus bridge 110 controls access by the processor 104 to the black partition 102B. In particular, in Black Mode, the bus bridge 110 only allows data addressed to the black peripherals 112A to pass through. It also prevents any of the black peripherals 112A from writing to the red register 106A or the red peripherals 112B. FIG. 4A illustrates the sequence of events that are necessary to change the mode of operation of the circuit 100 from Black Mode to Red Mode. In step 400, the processor 104 switches the black register 106B into Red Mode by closing gate 108C (i.e., the black partition gate) and opening gate 108D (i.e., the red partition gate). Next, in step 402, the processor 104 switches the red register 106A to Red Mode by closing gate 108A (i.e., the processor partition black gate) and opening gate 108B (i.e., the processor partition red gate).

Figure 4B:
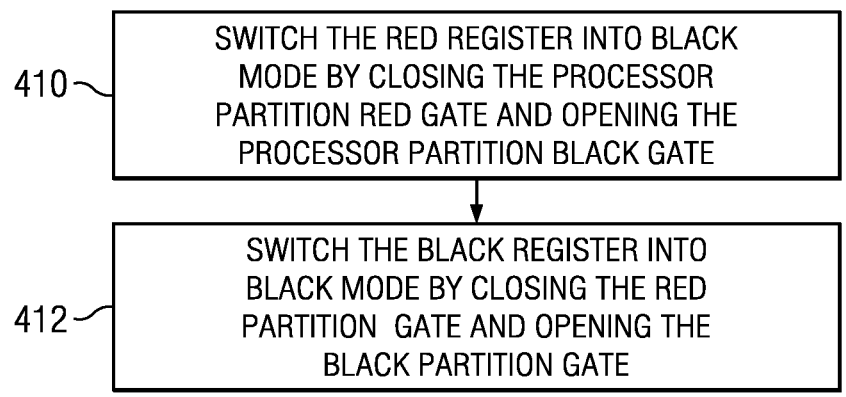

FIG. 4B illustrates the sequence of events that are necessary to change the mode of operation of the circuit 100 from Red Mode to Black Mode. In step 410, the processor 104 switches the red register 106A into Black Mode by closing gate 108B (i.e., the processor partition red gate) and opening gate 108A (i.e., the processor partition black gate). In step 412, the processor switches the black register 106B to Black Mode by closing gate 108D (i.e., the red partition gate) and opening gate 108C (i.e., the black partition gate). It will be noted that in each mode change scenario, the noted steps must be performed in the designated order. In fact, it is not possible to change register states out of order because the data to command the switch will be blocked by the states of the gates.

With embedded processors and SCC becoming more prevalent in today's circuit designs, a method for maintaining red and black data separate is vital. The embodiments described herein provide a method for ensuring such separation at a low resource utilization level. Additionally, the embodiments provide for a fail-secure design while still allowing a single processor to communicate with both red and black peripherals. By using three separation partitions, a failure in one partition, one gate, or addressing, will not result in red data being permitted to leak onto the black peripherals. Specifically, no fewer than three separate errors would have to occur before a data leak would be possible.

One embodiment is a circuit comprising a processor disposed in a processor partition. The circuit comprises a first set of peripherals disposed in a first peripheral partition; a second set of peripherals disposed in a second peripheral partition physically isolated from the first peripheral partition; a first state control register for controlling access to the first set of peripherals by the processor; and a second state control register for controlling access to the second set of peripherals by the processor. When the first and second state control registers are in a first mode of operation, the processor has read and write access to the first set of peripherals and write only access to the second set of peripherals. When the first and second state control registers are in a second mode of operation, the processor has read and write access to the second set of peripherals and read only access to the first set of peripherals.

Another embodiment is a circuit comprising a processor and a single data bus over which encrypted data is written to and read from a first set of peripherals and unencrypted data is written to and read from a second set of peripherals. The circuit further comprises means for placing the circuit in a first mode in which data can be written to and read from the first set of peripherals and only read from the second set of peripherals; and means for placing the circuit in a second mode in which data can be written to and read from the second set of peripherals and only written to the first set of peripherals.

Yet another embodiment is a method of implementing a secure data bus in a single chip cryptographic ("SCC")-compliant circuit comprising a processor and a single data bus over which encrypted data is written to and read from a first set of peripherals and unencrypted data is written to and read from a second set of peripherals. The method comprises, to place circuit in a first mode in which data can be written to and read from the first set of peripherals and only read from the second set of peripherals, placing the second state control register into a first mode; and placing the first state control register into the first mode after the switching the second state control register. The method further comprises, to place the circuit in a second mode in which data can be written to and read from the second set of peripherals and only written to the first set of peripherals, placing the first state control register into a second mode; and placing the second state control register into the second mode subsequent to the switching the first state control register to the second mode.

The foregoing outlines features of selected embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure, as defined by the claims that follow.

What is claimed is:

1. A circuit comprising a processor disposed in a processor partition, the circuit further comprising:
   a first set of peripherals disposed in a first peripheral partition;
   a second set of peripherals disposed in a second peripheral partition physically isolated from the first peripheral partition;
   a first state control register for controlling access to the first set of peripherals by the processor; and
   a second state control register for controlling access to the second set of peripherals by the processor;
   wherein when the first and second state control registers are in a first mode of operation, the processor has read and write access to the first set of peripherals and write only access to the second set of peripherals; and
   wherein when the first and second state control registers are in a second mode of operation, the processor has read and write access to the second set of peripherals and read only access to the first set of peripherals.

2. The circuit of claim 1 wherein encrypted data is read from and written to the first set of peripherals.

3. The circuit of claim 1 wherein unencrypted data is read from and written to the second set of peripherals.

4. The circuit of claim 1 further comprising a first set of gates each having a state controllable by one of the first and second state control registers for preventing read access to the second set of peripherals when the first and second state control registers are in the first mode of operation.

5. The circuit of claim 1 further comprising a second set of gates each having a state controllable by one of the first and second state control registers for preventing write access by the processor to the first set of peripherals when the first and second state control registers are in the second mode of operation.

6. The circuit of claim 1 wherein the circuit is implemented as a field programmable gate array.

7. The circuit of claim 1 further comprising a bus bridge disposed between the processor and the first set of peripherals.

8. The circuit of claim 1 further comprising a single data bus for communicating data between the processor and the first and second sets of peripherals.

9. The circuit of claim 1 wherein the second peripheral partition is physically isolated from the first peripheral partition in accordance with single chip cryptographic ("SCC") specifications.

10. The circuit of claim 1 wherein the first state control register is disposed in the first peripheral partition.

11. The circuit of claim 1 wherein the second state control register is disposed in the processor partition.

12. A circuit comprising a processor and a single data bus over which encrypted data is written to and read from a first set of peripherals and unencrypted data is written to and read from a second set of peripherals, the circuit further comprising:
   means for placing the circuit in a first mode in which data can be written to and read from the first set of peripherals and only read from the second set of peripherals; and
   means for placing the circuit in a second mode in which data can be written to and read from the second set of peripherals and only written to the first set of peripherals.

13. The circuit of claim 12 wherein the processor is disposed in a processor partition of the circuit, the first set of peripherals is disposed in a first peripheral partition of the circuit, and the second set of peripherals is disposed in a second peripheral partition of the circuit, wherein the first and second partitions are physically isolated from one another.

14. The circuit of claim 13 further comprising: a first state control register disposed in the first peripheral partition; and a second state control register disposed in the processor partition.

15. The circuit of claim 14 wherein the means for placing the circuit in a first mode of operation comprises a first set of gates each having a state controllable by one of the first and second state control registers for enabling read only access to the second set of peripherals when the first and second state control registers are in the first mode of operation and the means for placing the circuit in a second mode of operation comprises a second set of gates each having a state controllable by one of the first and second state control registers for enabling write only access by the processor to the first set of peripherals when the first and second state control registers are in the second mode of operation.

16. A method of implementing a secure data bus in a single chip cryptographic ("SCC")-compliant circuit comprising a processor and a single data bus over which encrypted data is written to and read from a first set of peripherals and unencrypted data is written to and read from a second set of peripherals, the method comprising:
   placing the circuit in a first mode in which data can be written to and read from the first set of peripherals and only read from the second set of peripherals by:
   placing a second state control register into a first mode; and
   placing a first state control register into the first mode after switching the second state control register; and
   placing the circuit in a second mode in which data can be written to and read from the second set of peripherals and only written to the first set of peripherals by:
   placing the first state control register into a second mode; and
   placing the second state control register into the second mode subsequent to switching the first state control register to the second mode.

17. The method of claim 16 wherein switching the second state control register into a first mode further comprises: opening a first processor partition gate; and closing a second processor partition gate.

18. The method of claim 16 wherein switching the first state control register into the first mode further comprises: opening a first partition gate; and closing a second partition gate.

19. The method of claim 16 wherein switching the first state control register to a second mode further comprises: closing a first partition gate; and opening a second partition gate.

20. The method of claim 16 wherein switching the second control state register to the second mode further comprises: closing a first processor partition gate; and opening a second processor partition gate.

* * * * *